(12) United States Patent
Lemaistre et al.

(10) Patent No.: US 7,891,480 B2
(45) Date of Patent: Feb. 22, 2011

(54) RAIL ELEMENT FOR CONVEYING SUSPENDED OBJECTS, PREFORM-SUPPLY DEVICE COMPRISING ONE SUCH ELEMENT AND CURVED FLAT BAND WHICH CAN BE FIXED TO ONE SUCH ELEMENT

(75) Inventors: Eric Lemaistre, Octeville-sur-Mer (FR); Alain Charpentier, Octeville-sur-Mer (FR); Cyril Savary, Octeville-sur-Mer (FR)

(73) Assignee: Sidel Participations, Octeville sur-Mer (FR)

( * ) Notice: Subject to any disclaimer, the term of this patent is extended or adjusted under 35 U.S.C. 154(b) by 591 days.

(21) Appl. No.: 11/915,523

(22) PCT Filed: May 23, 2006

(86) PCT No.: PCT/FR2006/001182

§ 371 (c)(1),
(2), (4) Date: Dec. 18, 2007

(87) PCT Pub. No.: WO2006/125911

PCT Pub. Date: Nov. 30, 2006

(65) Prior Publication Data

US 2008/0196998 A1    Aug. 21, 2008

(30) Foreign Application Priority Data

May 24, 2005    (FR) .................................. 05 05200

(51) Int. Cl.
B65G 29/00    (2006.01)
(52) U.S. Cl. .............. 198/466.1; 198/465.4; 198/678.1; 198/839
(58) Field of Classification Search .............. 198/465.4, 198/466.1, 603, 662, 678.1, 681, 724, 817, 198/836.3, 839
See application file for complete search history.

(56) References Cited

U.S. PATENT DOCUMENTS

| | | | | | |
|---|---|---|---|---|---|
| 3,767,028 A | * | 10/1973 | Rosso | ......................... | 198/405 |
| 3,860,104 A | * | 1/1975 | Strauss | ..................... | 198/459.3 |
| 3,944,058 A | * | 3/1976 | Strauss | ................... | 198/377.07 |
| 4,104,081 A | * | 8/1978 | Totten | .......................... | 134/23 |
| 4,577,651 A | * | 3/1986 | Murtz | .......................... | 134/111 |
| 4,861,166 A | * | 8/1989 | Kuwabara | ..................... | 366/219 |
| 5,516,239 A | | 5/1996 | Warren et al. | | |
| 5,582,796 A | * | 12/1996 | Carey et al. | ..................... | 422/65 |
| 6,024,518 A | | 2/2000 | Ouellette | | |

(Continued)

FOREIGN PATENT DOCUMENTS

CA    2419562 A1  *  2/2003

(Continued)

*Primary Examiner*—Douglas A Hess
(74) *Attorney, Agent, or Firm*—Sughrue Mion, PLLC (57) ABSTRACT

A rail element conveys suspended objects, such as bottles or preforms. The rail element includes two guide rails which are separated by a pre-defined distance and which form lateral support surfaces for the objects being conveyed along a conveyor passageway, such as preform sub-neck guides. A helically-curved conveyor section consists of a frame on which the guide rails are helically arranged. At least one guide rail includes a flat band that can be removed from the frame.

14 Claims, 4 Drawing Sheets

U.S. PATENT DOCUMENTS

| | | | |
|---|---|---|---|
| 6,173,827 B1 * | 1/2001 | Carey | 198/404 |
| 7,032,737 B2 * | 4/2006 | Egger | 198/405 |
| 7,431,150 B2 * | 10/2008 | Ranger | 198/836.3 |
| 2003/0094352 A1 | 5/2003 | Andreoli et al. | |
| 2003/0164280 A1 | 9/2003 | Delaporte et al. | |

FOREIGN PATENT DOCUMENTS

FR   2 876 363 A1   4/2006

* cited by examiner

RAIL ELEMENT FOR CONVEYING SUSPENDED OBJECTS, PREFORM-SUPPLY DEVICE COMPRISING ONE SUCH ELEMENT AND CURVED FLAT BAND WHICH CAN BE FIXED TO ONE SUCH ELEMENT

TECHNICAL FIELD

The present invention relates to a rail element for conveying objects in a suspended position, a preform feed device comprising such an element, and a curved flat strip which can be fastened to such an element.

Although intended more particularly for transporting preforms, the invention can be used for transporting bottles, jars or similar objects.

BACKGROUND OF THE INVENTION

The invention will be described more particularly within the context of its application to a container blow-molding apparatus in which the container is obtained by blow-molding a preform produced beforehand by injection molding. This preform has a substantially tubular body which is closed at one of its axial ends. Its other end has, right from this injection-molding operation, the final shape of the neck of the container.

Generally, the neck of the container comprises a thread and, at its base, an annular support flange which extends radially outward.

Figure 1:
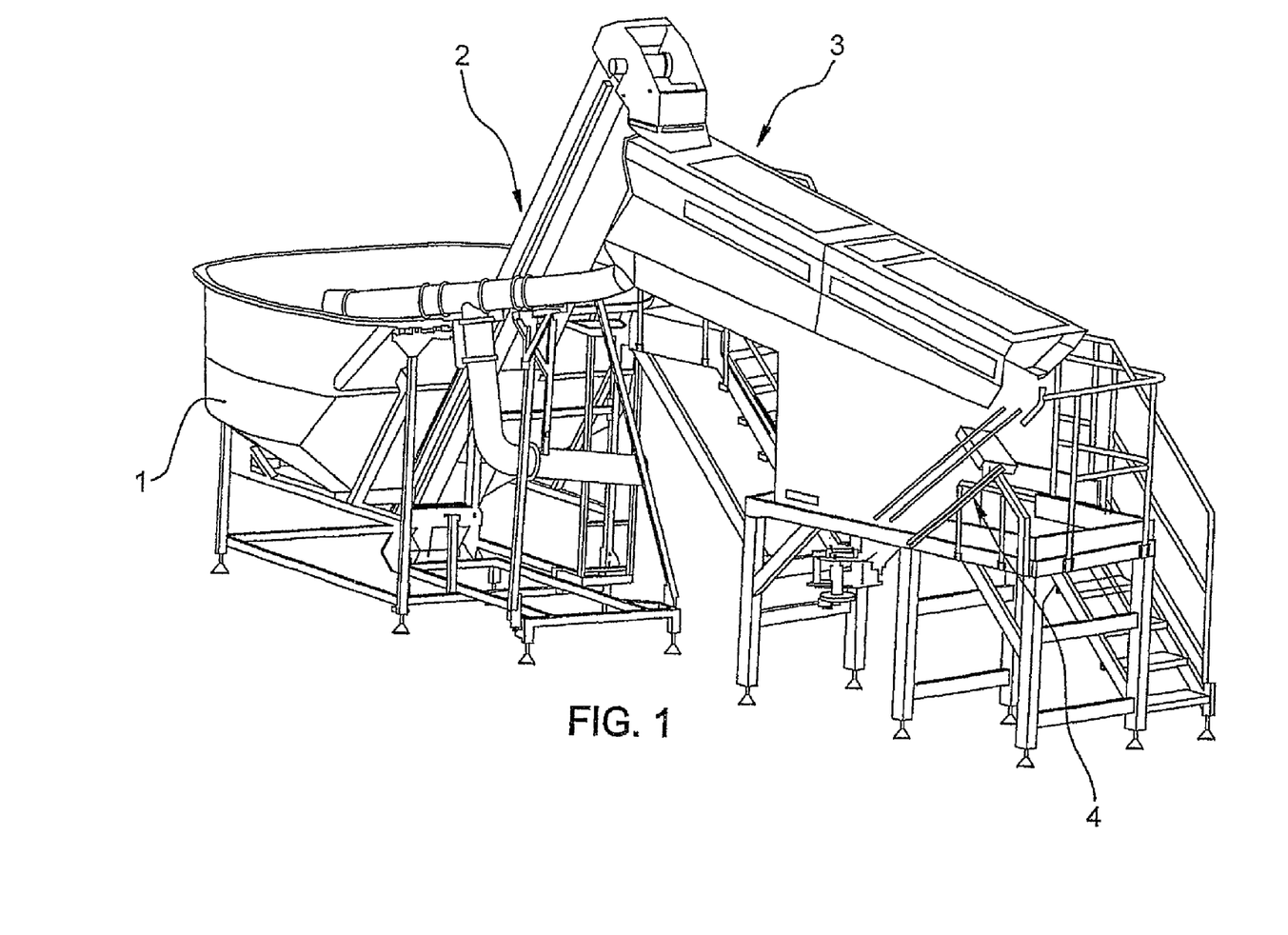
FIG. 1 is a view of a preform feed unit which is provided with a rail bend or element according to the invention.

FIG. 1 of the appended drawings is a perspective view illustrating a preform feed unit situated upstream of a blow-molding apparatus. The preforms are tipped as a loose mass into a bin 1. They are taken from this bin by an elevator belt 2 which tips the preforms, at a predetermined rate, into the upper end of an alignment hopper 3.

This alignment hopper 3 generally comprises two alignment rollers which are inclined with respect to the horizontal and which are substantially parallel to one another.

The two rollers are rotated in opposite directions and are separated from one another in such a way as to leave a gap between them.

This gap is slightly greater than the size of the body of the preforms and is smaller than the size of the support flange of the preforms.

Under the effect of gravity, the preforms are forced toward the bottom of the hopper where the two rollers are situated.

The rotational movement of the rollers and their inclination with respect to the horizontal ensure that the preforms are placed behind one another, suspended by their flanges bearing against the rollers.

The preforms slide along the axis of the rollers, toward the bottom of the hopper where they are collected in a feed rail 4 itself connected to the blow-molding machine (not shown).

Since the preforms are tipped as a loose mass into the bin 1, it is possible for some preforms not to be correctly placed between the rollers of the alignment hopper 3.

Of course, the improperly oriented preforms cannot be introduced into the feed rail 4 which leads to the blow-molding machine.

The same applies to preforms which are nested inside one another, even if the lower preform in this nesting arrangement is correctly oriented.

Hence, means for ejecting improperly oriented preforms or ones nested inside one another are generally provided to prevent preforms in such a configuration from joining the feed rail.

The feed rail 4 typically comprises a rectilinear part and a curved part, the curvature generally being partly in-plane, that is to say that the curvature is situated within one and the same plane, and partly out-of-plane, that is to say that a single plane in which the curvature remains cannot be defined, thereby generally forming a helical segment which can be composed over at least some of the curvature of a segment having planar curvature.

The formation of a segment section having helical curvature with some of the curvature being out-of-plane and/or some of the curvature being in-plane makes it possible to maintain a slope down which the preforms can flow by gravity.

The in-plane and out-of-plane curvature, namely the formation of a segment section having planar curvature (situated within the same plane) and/or a segment section having curvature which is not situated within the same plane, makes it possible for the preforms to enter the blow-molding machine without the unit represented in FIG. 1 interfering with maintenance interventions and operations on the blow-molding machine, the entire apparatus nevertheless remaining compact.

It is in fact desired for all the components of the blow-molding machines to remain easily accessible, by opening doors, and removing doors and cowlings.

The fitting of curved sections in the feed rail 4 makes it possible for the unit represented in FIG. 1 to be placed optimally with respect to the blow-molding machine so as to minimize the overall space occupied by a machine for blow-molding containers.

By way of example, the alignment rollers of the hopper 3 are substantially parallel to the linear oven used to heat-treat the preforms.

In the feed rail 4, the guides on which the preforms are suspended are formed by bearing and sliding sections for the preforms.

The bent part of the feed rail 4, which part is curved in-plane and most often out-of-plane, that is to say forming a segment section having planar curvature (situated within the same plane) and/or a segment section having curvature not within the same plane, constitutes a difficult passage for the preforms. Everything must be set up so as to prevent the preforms from remaining jammed in this curve or bent portion.

To enable preforms of different sizes to be conveyed by gravity, it is desirable for the guide rail to be provided with a pair of runners whose spacing can be modified, thus allowing the spacing between the runners to be quickly adapted to the diameter of the neck of the preforms.

In order to be able to modify the spacing of the two runners of a rail for conveying suspended objects such as bottles, it has been proposed to place actuators which allow the runners to be shifted substantially perpendicularly to the direction of travel of the bottles.

Nevertheless, in the case of the curved conveying sections, the provision of actuators is a relatively complex undertaking, since modifying the opening of the conveying rail has to take place with a controlled radius of curvature, and without the length of the runners being modified toward the inside or outside of the curve.

As a result, the extent to which runners or "under-neck guides" can be adjusted in existing devices is relatively small.

Document CA 2 419 562, in the name of Sidel Canada Inc, discloses an adjustable curved pneumatic bottle-transporting device. Although operationally satisfactory, this device proves to be complex and costly to mount.

Taking account of the difficulties mentioned above, and given that a technically and economically more satisfactory solution is not available, what happens in practice at present is that the bent portions of the preform feed rails are purely and simply changed in their entirety when the spacing of the runners has to be modified.

Moreover, this is done in spite of the relatively long time required for such an operation, during which time the container-forming machine cannot operate, resulting in a reduction in the profitability of the machine.

It would therefore be particularly beneficial to provide means which make it possible to modify the spacing of the runners on curved rail sections in a minimum of time and with maintenance operations which are simple to carry out.

Furthermore, it is necessary to provide a helically curved rail section for each type, in particular for each under-flange diameter, of preforms that it is wished to transport, making subsequent storage locations necessary. It would therefore be advantageous to produce means for modifying the spacing of the runners that are not bulky and can be stored and transported easily.

Moreover, since the curved rail sections having to be modified for each given spacing consist of a fixed frame on which a number of elements are welded to one another, they are relatively complex to machine and therefore relatively expensive; furthermore, they are bulky and, consequently, quite difficult to fit. Hence, the user of a blow-molding machine must make sufficient provision in advance when he wishes to modify the spacing of the runners, and the necessary logistics, at the expense of shutting down his machine until the new frame has been installed. Thus, it would therefore be beneficial to produce less bulky means which can be fitted more quickly and easily.

Moreover, when the containers to be transported along the runners are containers with an annular support flange, which flange surmounts a frustoconical body part, the runners must sometimes be cut to a point so as to be able to engage properly below the flange while not being blocked by said frustoconical body part situated below the flange. It would therefore be particularly advantageous to obtain sufficiently thin runners allowing engagement below any type of flange.

The Applicant has striven to solve the problems mentioned above.

SUMMARY OF THE INVENTION

Accordingly, to allow rapid modification of the spacing between two runners on which an object to be conveyed is to bear, the present invention relates to a rail element for conveying objects, such as bottles or preforms, in a suspended position, this element comprising two runners separated by a predefined distance, these runners forming lateral bearing surfaces for the objects being conveyed in a conveying passageway, in particular under-neck guides for preforms, wherein said rail element defines a helically curved conveying section and comprises a frame on which the runners are arranged in a helix, at least one runner being a flat strip which is removable from said frame.

To secure the frame with the runners, at least one runner is housed in support means provided in the frame.

In order to allow the use of one and the same frame for a number of pairs of runners with different spacings between them, at least one runner is at least partially complementary in shape with said support means. The fact is that if the support means were just complementary in shape with the runner, it would then not be possible to use a runner having a narrower width on the same frame. It would then be necessary to replace the frame, something which is one of the disadvantages which the invention overcomes.

To lock the runner in position and prevent its displacement while objects are being conveyed, the support means advantageously take the form of an offset provided in each branch of the conveying rail.

To allow the conveyed objects to slide along the runners without them rubbing against the frame, the internally curved lateral surface of the runner projects from each branch of the guide rail.

To fasten the runners removably to the frame and enable them to be replaced rapidly, at least one runner is fastened to the frame by way of screwing means.

In order to accelerate the flow of objects conveyed along the rail element according to the invention, the runner consists of a profile formed from a material which promotes sliding, such as PTFE-filled metal.

To prevent the body part of the conveyed object being brought into contact with the frame, and possible jamming, the rail element according to the invention comprises means designed to limit the lateral swinging of the conveyed objects.

The means designed to limit the lateral swinging of the conveyed objects advantageously comprise two slender bodies, in particular spiral bent tubes, placed below the runners, the rail element comprising means designed to vary the spacing between said slender bodies and/or the distance between said slender bodies and the runners.

To prevent a longitudinal swinging movement, i.e. from front to rear, of the conveyed objects as they are being conveyed, the rail element comprises means designed to keep the conveyed objects bearing on the runners.

In one particular embodiment, the frame comprises hoops for mounting an upper strip which defines a curved bearing section for the upper ends of the objects to be conveyed, in particular the mouth of bottles or of necks of preforms, this upper strip being placed substantially in vertical alignment with the conveying passageway bounded laterally by the runners.

To improve the sliding behavior of the objects conveyed on the runners, these runners comprise a groove in which a sliding strip is mounted removably, in particular by snap-fitting.

Advantageously, according to a preferred aspect of the application of the rail element according to the invention, the present invention also relates to a device for feeding preforms to a blow-molding machine, comprising a rail element having the features as mentioned above and a system for segregating the preforms, wherein this rail element connects the outlet of the segregating system to a rectilinear portion of a preform feed rail.

The present invention also relates to a curved flat strip which can be fastened removably to a frame of a rail element for conveying objects, such as bottles or preforms, in a suspended position and which allows the conveyed objects to slide by forming a lateral bearing surface for the conveyed objects, said strip being able to be shaped in a helix when being fastened to said frame so as to constitute a runner.

BRIEF DESCRIPTION OF THE DRAWINGS

Other objects and advantages of the invention will become apparent from the description of embodiments which follows, this description being given with reference to the appended drawings, in which.

DESCRIPTION OF THE PREFERRED EMBODIMENT OF THE INVENTION

Figure 2:
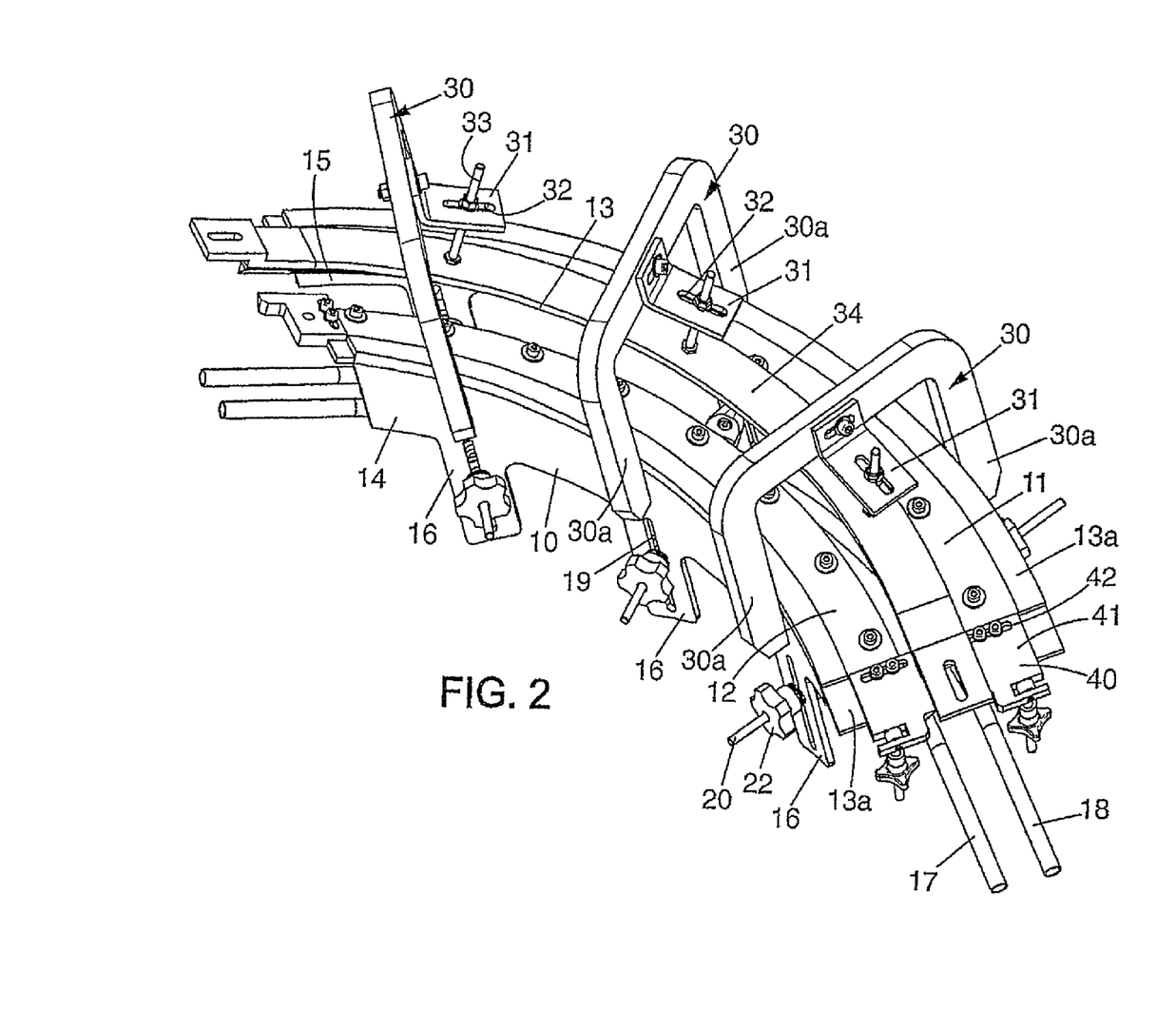
FIG. 2 is a perspective view of a rail bend or element according to one embodiment of the invention.
Figure 3:
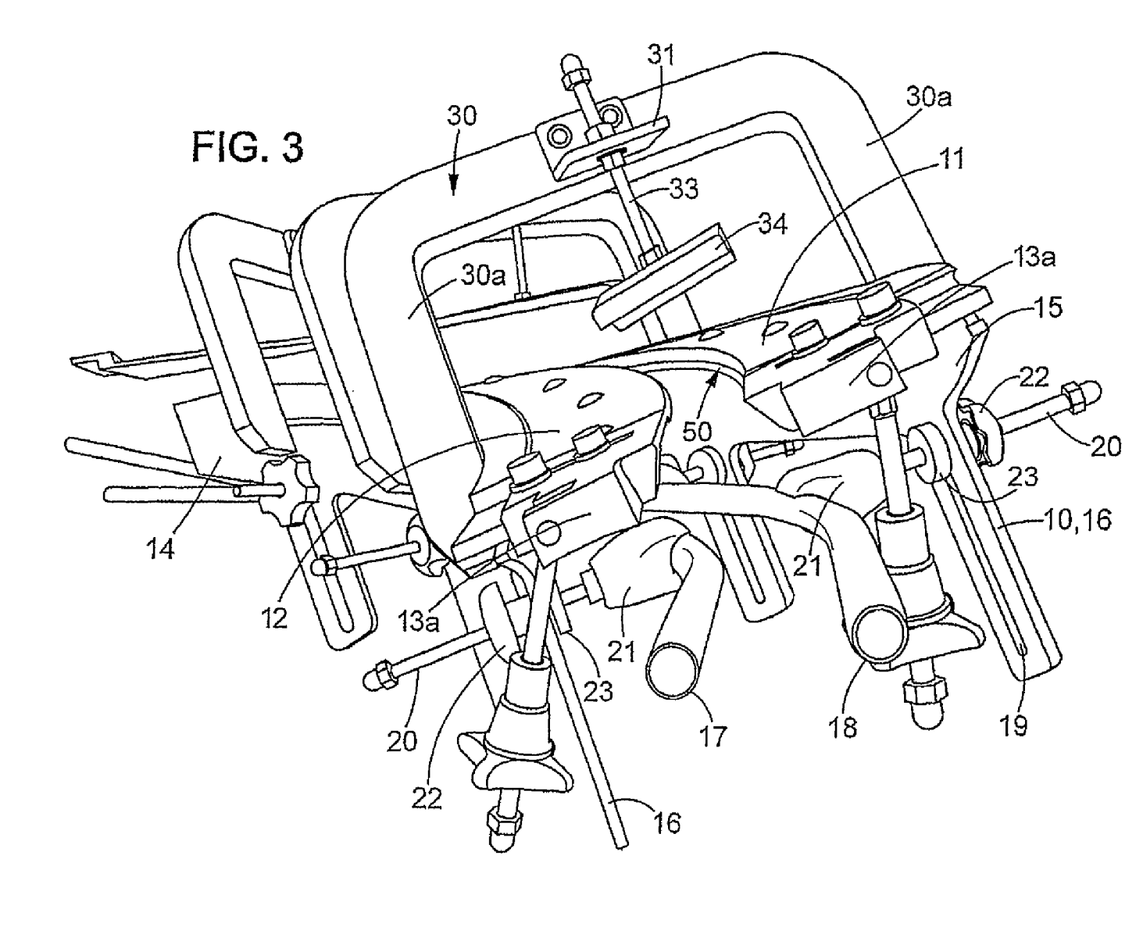
FIG. 3 is a side view of the bend represented in FIG. 2.

The conveying rail element according to the invention represented in FIG. 2 comprises a frame 10 supporting two removable runners 11, 12 which bound a conveying passageway 13 for objects suspended on these two runners 11, 12.

The runners 11, 12 form a conveying rail, for example a preform feed rail for a machine for blow-molding containers (this machine not being shown in the figures but being of a type which is known per se).

In the embodiment shown in the figures, this conveying operation is performed by gravity: the objects such as preforms or bottles are suspended on the runners 11, 12 and flow by gravity in the conveying passageway 13, the runners 11, 12 being curved in-plane and/or out-of-plane on the frame 10, so as to form a helical or helicoidal section.

However, it is intended that the invention can be used for conveying rails in which the conveyed objects are propelled by a fluid, for example air.

It is also intended that the invention can be used for conveying rails in which there is only one rail bend or element in-plane.

The conveyed objects (not shown) are provided with projections by means of which they can bear laterally against the runners 11, 12.

For example, the objects are preforms or bottles provided with an annular projection, known as a flange, situated below the neck (or throat). Thus, the runners 11, 12, placed one on each side of the throat of the bottles or preforms, guide them and support them, for which reason these runners are termed "under-neck guides" by a person skilled in the art.

The spacing between the runners 11, 12 is as precise as possible and constant, the tolerance for the gaps between runners 11, 12 being around a tenth, or possibly two to three tenths, of a millimeter.

The frame 10 comprises two side walls or faces 14, 15 provided with lugs 16.

These lugs 16 support means for guiding the body of the conveyed objects.

These guide means have the task of preventing or at the very least limiting the lateral swinging movements of the conveyed objects. They comprise two slender bodies, in particular spiral bent tubes 17, 18, placed below the runners 11, 12, the spacing of which is substantially constant and slightly greater than the diameter of the body of the suspended object.

Advantageously, the rail element comprises adjustment means designed to vary the spacing between said slender bodies and/or the distance between the slender bodies and the runners 11, 12. More specifically, the spacing between the tubes 17, 18 and the distance separating these tubes 17, 18 from the bearing region formed by the runners 11, 12 is adjustable.

To this end, the lugs 16 are each provided with an oblong slot 19 through which passes a rod 20. Thus, the frame 10 comprises two side faces 14, 15, one on each side of the conveying passageway 13, with slots 19 arranged at predefined distances on these side faces 14, 15, at least one of the two slender bodies being mounted secured to threaded rods 20 which pass through the slots 19.

Each rod 20 is provided, at a first end part, with an end fitting 21 for supporting a tube 17, 18. For example, this end fitting 21 is screwed onto the rod 20 and is provided with a recess in which a tube 17, 18 is snap-fitted.

Each rod 20 is provided with a thread and comprises, at its second end part, a handwheel 22. Thus, each threaded rod 20 is provided with handwheels 22 which, when screwed or unscrewed, make it possible to vary the distance between the slender body and a side face 14, 15 of the frame 10.

Each handwheel 22 bears against a face of a lug 16 of the frame 10, and a clamping ring 23, mounted by being screwed onto the rod 20, bears against the other face of this lug 16. Advantageously, screwing or unscrewing the handwheel 22 and the ring 23, on either side of the slot 19 used to mount the rod 20, makes it possible to vary and fix the distance between the slender body and a side face 14, 15 of the frame 10.

More specifically, the operations of screwing or unscrewing the handwheel 22 and the ring 23 make it possible to modify the distance between a tube 17, 18 and the lugs 16 of the frame 10, and thus to modify the spacing between the tubes 17, 18.

It is also possible to vary the position of the rods 20 in the slots 19 of the lugs 16, and thus to modify the distance between tubes 17, 18 on the one hand and runners 11, 12 on the other hand.

The position of one guide tube 17, 18 on the frame 10 can be modified independently of the position of the other tube 17, 18. It is thus possible to convey objects of varied shapes (non-cylindrical containers for example).

The frame 10 carries hoops 30 in the shape of a U whose opening is directed toward the runners 11, 12. In the embodiment represented, these hoops 30 comprise arms 30a placed substantially in alignment with the slots 19 in the lugs 16.

An angle bracket 31 is mounted, for example by screwing, on each hoop 30. This angle bracket is provided with an oblong hole 32 for the passage of a threaded rod 33.

This threaded rod is secured to a strip 34 placed substantially in vertical alignment with the conveying passageway 13. In the embodiment represented, this strip 34 is curved in-plane and/or out-of-plane in a manner which is substantially identical to the curvatures of the runners 11, 12.

In other words, the frame 10 comprises hoops 30 for mounting an upper strip 34 that defines a curved bearing section for the upper ends of the objects to be conveyed, in particular the mouth of bottles or of necks of preforms, this upper strip 34 being placed substantially in vertical alignment with the conveying passageway 13 bounded laterally by the runners 11, 12.

The upper parts of the conveyed objects, for example the mouths of the bottles or of the necks of preforms, bear in a sliding manner on the lower face of this strip 34, thus making it possible to prevent a longitudinal swinging movement, that is to say from front to rear, of the conveyed objects while they are moving, the strip 34 preferentially exerting a thrust force so as to press the projecting elements of the conveyed objects to bear against the runners 11, 12. Consequently, the rail element according to the invention comprises means designed to keep the conveyed objects bearing against the runners 11, 12.

The position of the strip 34 with respect to the hoops 30, and thus with respect to the runners 11, 12, is adjusted by means of nuts or handwheels mounted on the threaded rods 33.

It is thus possible to adapt the rail to various heights of bottle necks or preform necks. In this way, the rail element comprises means for varying the distance between the upper bearing strip 34 and the runners 11, 12. More specifically, the hoops 30 are provided with a part in the form of an angle bracket 31, a threaded rod 33 secured to the upper strip 34 and passing through an oblong hole 32 in this angle bracket 31, this rod 33 being provided with a handwheel which, when screwed/unscrewed, makes it possible to vary the distance between the upper strip 34 and the runners 11, 12. The upper strip 34 thus defines a curved section mounted in a bent configuration on the hoops 30 of the frame 10 and consists of a profile formed by or coated with a material which promotes sliding, such as PTFE.

According to one embodiment, the runners 11, 12 comprise, on their inner lateral curved surface 11b, 12b, a groove in which a seal or a sliding strip is mounted removably, in particular by snap-fitting.

Advantageously, the runners 11, 12 are mounted removably on the frame 10, for example by screwing.

According to a preferred embodiment, the runners 11, 12 are produced by laser cutting or by any other type of means for cutting a plate or a strip that are known per se.

In order to promote sliding between conveyed objects and runners, the runners 11, 12 are advantageously produced or coated with a strip of polymer material, such as PTFE. Advantageously, at least one runner 11, 12 is a profile formed by or coated with a material which promotes sliding. Thus, the material of the runner 11, 12 is any type of material which has a low coefficient of friction and promotes sliding, for example metal, PTFE, synthetic materials (Teflon®) or PTFE-filled metal, such as PTFE-filled aluminum.

Advantageously, the runners 11, 12 are made of a material which is able to be arranged in a helix manually when placing the runners 11, 12, for example by screwing, on the frame 10.

The spacing between the runners 11, 12 can thus be adjusted in a simple and economical manner.

Figure 4:
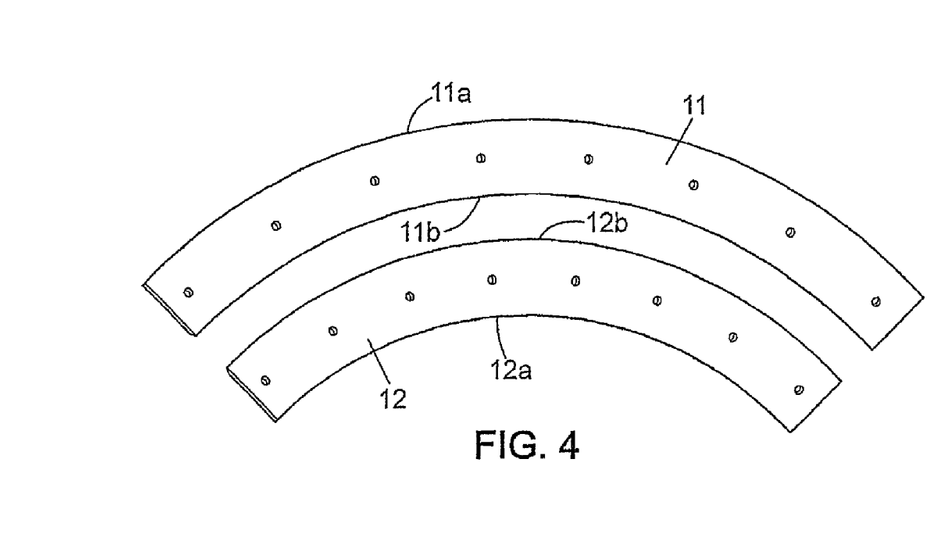
FIG. 4 is an upper view of a pair of strips before mounting and shaping into runners on a rail element according to the invention.
Figure 5:
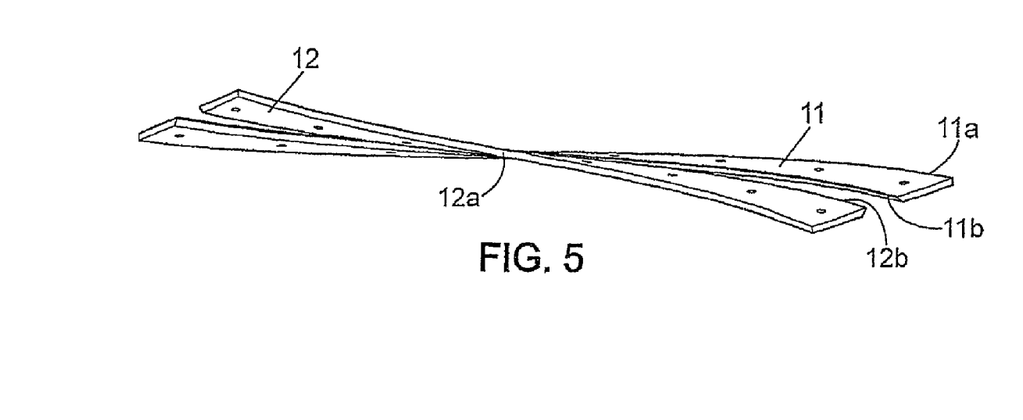
FIG. 5 is a front perspective view of a pair of strips after mounting and shaping into runners on a rail element according to the invention, the curve section not being represented in FIG. 5 for reasons of clarity.

Specifically, as is apparent from FIG. 4, the runners 11, 12 are machined in the form of a pair of flat strips in which the curvature and the constant given spacing between the runners 11, 12 for a given conveyed container diameter have been predetermined.

Thus, before being mounted on the frame 10, the runners 11, 12 take the form of a pair of flat strips with a defined curvature which is calculated to allow the runners 11, 12 to be arranged in a helix on the helical frame 10.

To allow rapid replacement of the runners 11, 12 dependent on the spacing between them, the frame 10 is common to pairs of runners 11, 12 having different spacings for the conveyance of containers with different diameters.

Specifically, the frame 10 according to the invention has support means 50 in which the runners 11, 12 can be housed and fastened, each runner 11, 12 at least having a shape which is partially complementary with the support means 50.

The support means 50 are advantageously in the form of an offset or space in each branch 13a of the conveying rail and are complementary in shape with the externally curved lateral surface 11a, 12a of each runner 11, 12.

It is thus possible to house each runner 11, 12 partially on these support means 50, the internally curved lateral surface 11b, 12b of each runner 11, 12 projecting from each branch 13a of the conveying rail in such a way as to support the projecting elements, such as the flange of a preform, of the conveyed objects.

It is within the capabilities of a person skilled in the art to precalculate what should be the curvature of the flat strips when cutting them so that they can be arranged in a helix with a constant spacing between them when they are fastened removably to the fixed frame 10 forming the helically curved conveying section.

In this way, rather than changing the entire rail section, it is only necessary to change the runners 11, 12 which are produced from a flat strip of material and which are arranged in a helix at the time of mounting on the frame 10 as a function of the in-plane and/or out-of-plane curvatures desired for the section.

Advantageously, the runners 11, 12 in the form of strips are fastened removably to the frame 10 by way of screw-type screwing means uniformly distributed over the length of the runner 11, 12. Nevertheless, other fastening means are conceivable, such as pressure systems.

A fine adjustment of the spacing between two runners 11, 12 can be obtained by screwing the runners 11, 12 through oblong mounting holes.

Generally, the invention thus relates to a rail element for conveying objects, such as bottles or preforms, in a suspended position, this element comprising two runners 11, 12 separated by a predefined distance, these runners 11, 12 forming lateral bearing surfaces for the objects being conveyed in a conveying passageway, in particular under-neck guides for preforms, wherein it defines a helically curved conveying section and comprises a frame 10 on which the runners 11, 12 are arranged in a helix, at least one runner 11, 12 being a flat strip which is removable from said frame 10.

Likewise, good coupling between sections can be achieved via adjustable abutment means 40. These adjustable abutment means 40 comprise a piece 41 for connection between sections, this piece being provided, at its first end part, with an oblong hole 42 for assembly by screwing to a first section, this piece comprising, at its second end part, a handwheel 43 for mounting on a second rail section, it being understood that the frame 10 is not detached from the other rail sections during the modification of the spacing between the runners 11, 12.

The present invention relates more particularly to a device for feeding preforms to a blow-molding machine, comprising a rail element according to the invention and a segregating system or alignment hopper 3, the rail element connecting the outlet of the segregating system to a rectilinear portion of a preform feed rail.

Generally, the invention also relates to a curved flat strip which can be fastened removably to a frame 10 of a rail element for conveying objects, such as bottles or preforms, in a suspended position and which allows the conveyed objects to slide by forming a lateral bearing surface for the conveyed objects, said strip being able to be arranged in a helix when being fastened to said frame 10 so as to constitute a runner 11, 12.

The invention claimed is:

1. A rail element for conveying, in a suspended position, objects provided with a neck and projections, the rail element comprising:

two runners separated by a predefined distance extending in a crosswise direction in relation to a length of a conveying passageway, the runners being under-neck guides which are disposed on opposite sides of the necks and form lateral bearing surfaces for bearing the projections of the objects being conveyed the conveying passageway, wherein said rail element defines a helically curved conveying section and comprises a frame on which the runners are arranged in a helix, the bearing surfaces being parallel to the helix and the crosswise direction, at least one runner of the two runners being a flat strip which is removable from said frame and which is arranged in the helix when being fastened to said frame.

2. The rail element as claimed in claim 1, wherein the at least one runner is housed in support means provided in said frame.

3. The rail element as claimed in claim 2, wherein said at least one runner is at least partially complementary in shape with said support means.

4. The rail element as claimed in claim 2, further comprising branches and wherein said support means is disposed with an offset in at least one of the branches in relation to the at least one runner.

5. The rail element as claimed in claim 1, further comprising branches and wherein the at least one runner comprises an internally curved lateral surface which projects from at least one of the braches.

6. The rail element as claimed in claim 1, wherein at least one runner is fastened to said frame by way of screwing means.

7. The rail element as claimed in claim 1, wherein the at least one runner is a profile formed from PTFE-filled metal.

8. The rail element as claimed in claim 1, further comprising means for limiting the swinging of the conveyed objects.

9. The rail element as claimed in claim 8, wherein the means for limiting the swinging of the conveyed objects comprises two slender bodies, placed below the runners, the rail element further comprising means for varying a spacing between said slender bodies or a distance between said slender bodies and the runners.

10. The rail element as claimed in claim 1, further comprising means for keeping the conveyed objects bearing on the runners.

11. The rail element as claimed in claim 10, wherein the frame comprises hoops for mounting an upper strip which defines a curved bearing section for upper ends of the necks of the objects to be conveyed, the upper strip being placed substantially in alignment with the conveying passageway bounded laterally by the runners.

12. The rail element as claimed in claim 1, wherein the runners comprise a groove in which a sliding strip is mounted removably.

13. A device for feeding preforms to a blow-molding machine, comprising the rail element as claimed in claim 1 and a system for segregating the preforms, wherein the rail element connects an outlet of the segregating system to a rectilinear portion of a preform feed rail.

14. A curved flat strip which is configurable to be fastened removably to a frame of a rail element for conveying objects each comprising a neck and projections, in a suspended position, and
- which forms a lateral bearing surface which bears the projections and along a side of which the necks of the conveyed objects slide, said flat strip being arranged in a helix when being fastened to said frame to constitute a runner,
- wherein the bearing surface extends away from the necks in a direction substantially parallel to a crosswise direction in relation to a length of a conveying passageway.

\* \* \* \* \*